United States Patent [19]

Hegge

[11] Patent Number: 5,522,927
[45] Date of Patent: * Jun. 4, 1996

[54] AIR ENTRAINMENT COMPOSITIONS FOR CEMENT COMPOSITIONS

[75] Inventor: Timothy Hegge, Collegeville, Pa.

[73] Assignee: Henkel Corporation, Plymouth Meeting, Pa.

[*] Notice: The portion of the term of this patent subsequent to Aug. 15, 2014, has been disclaimed.

[21] Appl. No.: 449,318

[22] Filed: May 24, 1995

Related U.S. Application Data

[63] Continuation-in-part of Ser. No. 226,723, Apr. 12, 1994, Pat. No. 5,431,729.

[51] Int. Cl.$^6$ ...................................................... C04B 24/34
[52] U.S. Cl. ........................ 106/659; 106/724; 106/728; 106/731; 106/218; 106/805; 106/822; 106/823; 530/210; 560/68
[58] Field of Search ................... 106/659, 713, 106/724, 802, 805, 218, 216, 820, 822, 823, 728, 731; 560/68; 530/210

[56] References Cited

U.S. PATENT DOCUMENTS

| | | | |
|---|---|---|---|
| 4,391,645 | 7/1983 | Marcellis et al. | 106/90 |
| 4,402,753 | 9/1983 | Amara et al. | 106/94 |
| 4,606,938 | 8/1986 | Reiling | 427/136 |
| 4,853,465 | 8/1989 | Cowan et al. | 530/506 |
| 5,173,117 | 12/1992 | Inokawa et al. | 106/823 |
| 5,431,729 | 7/1995 | Hegge | 106/823 |

FOREIGN PATENT DOCUMENTS 354502   8/1931   United Kingdom.

OTHER PUBLICATIONS 71 104857s 1969 Chemical Abstract (no month).
88 125395f 1975 Chemical Abstract (no month).
88 138827y 1977 Chemical Abstract (no month).
92 151993b 1979 Chemical Abstract (no month).
71 84287a 1968 Chemical Abstract (no month).
75 9946a 1962 Chemical Abstract (no month).
75 39979z 1969 Chemical Abstract (no month).
"Resins, Natural", *Encyclopedia of Polymer Science & Engineering*, vol. 14, pp. 438–444, J. Wiley & Sons, NY, NY, 1988 (no month).
"Cement," *Encyclopedia of Chemical Technology*, 5th edition, vol. 5, pp. 564–598, J. Wiley & Sons, NY, NY, 1988 (no month).
"Construction System Uses Pumice", *Concrete Products*, Apr. 1994, p. 69, Circle 58.

*Primary Examiner*—Karl Group
*Assistant Examiner*—Michael Marcheschi
*Attorney, Agent, or Firm*—Ernest G. Szoke; Wayne C. Jaeschke; J. Daniel Wood

[57] ABSTRACT

Compositions and methods relating to cementitious compositions are provided. The use of a blend of a rosin and a tannin to entrain air into cementitious compositions is provided. A blend of a rosin and a tannin in a weight ratio of about 1:1.22 to about 1:1.86 are added to a wet cementitious composition at levels of less than 1% by weight based on the weight of the cement and air is mixed into the cement. The resulting cement will contain, e.g. 5% to 10% by volume air which improves the resistance of the set cement to freeze damage. Also provided is a method of entraining air into a cementitious composition which employs such a blend.

28 Claims, No Drawings

AIR ENTRAINMENT COMPOSITIONS FOR CEMENT COMPOSITIONS

CROSS-REFERENCE TO RELATED APPLICATIONS

This application is a continuation-in-part of U.S. Serial No. 08/226,723 filed 12 April 1994 now U.S. Pat. No. 5,431,729, the disclosure of which is incorporated by reference herein.

FIELD OF THE INVENTION

This invention relates to naturally derived compositions useful for entraining air in cement compositions.

BACKGROUND ART

It is usual practice to add air entraining agents to cement based mixes such as concrete and mortar, in order to entrain microscopic bubbles of air in the mixture. This imparts certain advantages to the concrete or mortar. It plasticizes the mix, making it more workable, and in this respect the entraining agent often acts as a replacement, at least in part, for lime. When the concrete or mortar sets the entrained bubbles increase its elasticity, its resistance to salt solutions and, particularly, its resistance to frost damage.

Air entraining agents are generally surfactant mixtures which produce a foam in the cement that persists so that the set cement contains many small, generally spherical, air voids, e.g. that measure from 10 micrometers to 250 micrometers in diameter. These air voids are thought to alleviate internal stresses in the cement that are caused when moisture freezes in the pores in the cement that are inherently formed during setting of the cement. In practice, up to about 10% air by volume of the cement is entrained into the cement to be placed in severe environments.

SUMMARY OF THE INVENTION

This invention relates generally to a blend composition that is useful for entraining air into cementitious compositions. In one aspect, this invention relates to composition useful for entraining air into a cementitious composition comprised of a blend consisting essentially of a rosin and a tannin in a ratio by weight of from about 10:1 to about 1:10. In certain embodiments, said composition is an essentially dry powder, e.g. it has a moisture content of less than about 20% by weight and preferably a sufficiently low moisture content to render said dry powder flowable. In preferred embodiments, the blend further contains an alkaline material in an amount sufficient to neutralize said blend, i.e. impart to an aqueous dispersion or solution of said blend an essentially neutral or alkaline pH, e.g. a pH of from about 6 to about 13.

In a related aspect, this invention relates to an aqueous dispersion or solution comprised of a minor amount by weight of a blend consisting essentially of a rosin and a tannin in a ratio by weight of from about 10:1 to about 1:10, and a major amount by weight of water. The aqueous dispersion or solution will typically contain said blend at a solids content of from about 5% to about 50% by weight, more typically from about 10% to about 15%. In preferred embodiments, said aqueous dispersion or solution further contains an alkaline material in an amount sufficient to neutralize said blend, i.e. impart to an aqueous dispersion or solution of said blend an essentially neutral or alkaline pH, e.g. a pH of from about 6 to about 13. Both the aqueous composition and flowable powder are useful as additives in industrial products such as hydraulic cement mixes.

In another aspect, this invention relates to a cementitious composition comprising a hydratable cementitious material in a major amount by weight and an air entrainment agent consisting essentially of a rosin in a minor amount by weight of said cementitious composition and a tannin and in a minor amount by weight of said cementitious composition, the ratio by weight of said rosin to said tannin ranging from about 10:1 to about 1:10. In preferred compositions, from about 0.0005% to about 0.5% by weight (dry basis) of a blend of a rosin and a tannin based on weight of cement is present to entrain air into the cementitious composition.

In a related aspect, this invention relates to a method of entraining air into a cementitious composition comprising mixing a minor amount by weight of an air entrainment agent consisting essentially of a rosin and a tannin in a ratio by weight of from about 10:1 to about 1:10 with major amount by weight of a hydratable cementitious composition comprised of a cement and water, the amount of said air entrainment agent being effective to entrain from about 1% to about 20% by volume of air into said cementitious composition.

DETAILED DESCRIPTION OF THE INVENTION

Rosin is predominantly comprised of a complex mixture of monocarboxylic acids of alkylated hydrophenanthrene compounds which are isolated from pine trees. The monocarboxylic acids represent about 90% by weight of most commercially available rosins. Gum rosin is sometimes also known as colophony and is derived from various species of pine trees, which when tapped yield an oleoresinous product known as crude turpentine. Steam distillation removes the oil of turpentine and leaves the solid rosin. Ranging in color from pale yellow to dark brown, gum rosin is usually soft, brittle and practically transparent. It has an aromatic odor and is soluble in alcohol, acetic acid and volatile and mixed oils. Typically, the specific gravity ranges from 1.045 to 1.085. The softening point is about 75° C. or 167° F. with a melting point of about 120° to 135° C. With regard to its chemistry, gum rosin consists almost entirely of abietic acid possibly in the form of isomers thereof.

In addition to the historic gum rosin, there are two other types of rosin products commercially available, wood rosin and tall oil rosin. Wood rosin is a rosin product isolated from aged pine stumps left from either the clearing of land for farming or lumbering operations. The stumps are shredded and the resulting wood chips are soaked in an organic solvent under elevated temperature and pressure. The extract is distilled to collect nonvolatile crude rosin, volatile extractibles and recovered solvent. Tall oil rosin is a by-product of pulping. Raw wood chips are digested under heat and pressure with caustic and sodium sulfide. Soluble sodium salts of lignin, rosin and fatty acids are in a solution separated from the wood pulp. The fatty acids and rosin float to the top of the solution and are skimmed off and acidified to free the rosin and fatty acids. This mixture is known as crude tall oil and is refined by fractional distillation to produce tall oil rosin and tall oil fatty acids.

The characteristics and properties of rosins are well known in the art. Rosins, their properties, manufactures, and uses are described, for example, in "Resins, Natural", *Encyclopedia of Polymer Science and Engineering*, vol. 14, pp. 438–444 (John Wiley & Sons, Inc. N.Y., N.Y., 1988), the disclosure of which is incorporated herein by reference.

Tannins are plant-derived polyhydroxyphenolic compounds characterized by their ability to precipitate proteins. The tannin component can be obtained from the various wood and vegetation materials found throughout the world. Tannins are a large group of water-soluble, complex organic compounds. Almost every tree or shrub that grows contains some tannins in the leaves, twigs, barks, wood or fruit. Examples of barks are wattle, mangrove, oak, eucalyptus, hemlock, pine, larch and willow. Examples of woods are the quebracho, chestnut, oak and urunday. Examples of fruits are myrobalans, valonia, divi-divi, tara, and algarobilla. Examples of leaves are sumac and gambier and examples of roots are canaigre and palmetto. Specific examples of plants which may be used as a source of tannin (with the principal country or region of availability being shown in parentheses) include: wattle, also known as acacia or mimosa (South Africa, South America, especially Brazil); quebracho (Argentina, Paraguay and Brazil); chestnut (France and Italy); myrobalans (India); mangrove (swampy, tropical areas such as southern Florida, Columbia, Brazil, Africa); divi divi (western coast of South America); tara (Peru); sumac (Sicily, Albania and Yugoslavia); cypress (United States); gambier (Malaysia, Sumatra, Borneo); and chestnut oak (blighted in the United States, but available from numerous other sources).

The tannins can be categorized into the traditional "hydrolyzable" tannins and "condensed" tannins. Examples of condensed tannin extracts are those manufactured from the bark of the black wattle tree (or mimosa tannin of commerce), from the wood of the quebracho tree (Spanish: Quebra hacha, axe-breaker,) from the bark of the hemlock tree, and from the bark of several commonly used pine species. The preparation of wattle and quebracho extracts is a well established industrial practice and such extracts are freely available in considerable amounts. Preferred tannins are in their native form as extracted and have not been chemically modified, e.g. by oxidation or by alkaline or acid hydrolysis.

Condensed tannin extracts, such as wattle and quebracho, are composed of approximately 70% polyphenolic tannins, 20% to 25% nontannins, mainly simple sugars and polymeric carbohydrates (hydrocolloid gums), the latter of which usually constitute 3% to 6% of the extract and heavily contribute to extract viscosity, while the balance is accounted for by a low percentage of moisture. Although the exact structure is not known, it is believed that the main polyphenolic pattern in quebracho tannins is represented by flavonoid analogues based on resorcinol A and pyrogallol B rings.

The word "tannin" as used herein and in the claims, unless otherwise specified, refers to and includes the gallotannins and the flavotannins. Examples of the gallotannins include: tannic acid or Chinese tannin; Turkish tannin; Hamamelis tannin; Acer tannin; Glucogallin; Sumac tannin; Valonia oak gall tannin; tea tannin; and tannins of Tara, Myrobalam, Divi-Divi, Algarobillo, oak, and chestnut. Examples of flavotannins include tannins from Gambier and catechu or Burma Cutch, quebracho, Tizerah, Urunday, wattle, mangrove, spruce, hemlock, larch, willow, pecan shells and Avaram. Said flavotannins are the presently preferred tannins for use in accordance with the invention.

Quebracho is the most preferred tannin. Quebracho is extracted from the bark and wood of the quebracho tree with water. The conventional method of preparing quebracho is to disintegrate the wood and bark, extract the bark and/or wood with water, after which the solution of quebracho and water is evaporated to about an 85 percent concentration of quebracho and the concentrated quebracho is spray dried. Quebracho is the most common commercial catechol tannin or flavotannin product. The high tannin content (about 20 percent) of the wood of the quebracho tree makes it the most important source of catechol tannins. The principal commercial source of gallotannins is gall nuts. Preferred tannin materials will contain at least about 60% by weight of compounds identified as tannins.

The weight ratio of rosin to tannin in the blend may vary broadly. Preferred blends have ratios that are closer to equal proportions of rosin and tannin, e.g. a weight ratio of from about 3:1 to about 1:3, more preferably from about 1.5:1 to about 1:1.5. Preferred compositions have a weight ratio of rosin to tannin of greater than about 1:2, e.g. from about 2:1 to about 1:1.5. Blends that are particularly preferred for controlling the air content of the cement to a small range have a ratio centered at about 1:1.5, e.g. from about 1:1.22 to about 1:1.86, more narrowly from 1:1.38 to 1:1.63, and even more narrowly from 1:1.44 to 1:1.56.

Because the blend is composed of carboxylic acids and phenols, it will, if unneutralized, have a pH on the acid side, e.g. from about pH 3 to about pH 5. To be active as an air entrainment agent, a substantial amount of the carboxylic acids in the rosin must be present in the carboxylate form. While the cementitious compositions to which the blend will be added are typically alkaline, it may not be strictly necessary to neutralize the blend prior to its addition to a cementitious composition. However, pre-activating the blend by pre-neutralization will facilitate efficient incorporation of active air entraining material into the cementitious composition. Thus, if the rosin as obtained is not pre-neutralized, the blend should further contain an alkaline material in an amount sufficient to neutralize said blend, i.e. impart to an aqueous dispersion or solution of said blend an essentially neutral or alkaline pH, e.g. a pH of from about 6 to about 13. Examples of useful alkaline materials include alkali or alkaline earth hydroxides, oxides or carbonates, e.g. sodium hydroxide, caustic soda (i.e. a blend of sodium hydroxide and sodium oxide), potassium hydroxide, sodium carbonate, potassium carbonate, aqueous ammonia, calcium oxide, and calcium hydroxide.

The blend can be used either as a dry blend or as an aqueous dispersion or solution of the components. Efficient dispersion of the blend in water at relatively low blend solids, e.g. 5% to 25% blend solids, facilitates dispersion of the blend throughout the cementitious composition. Thus, the blend is preferably added to the cementitious composition as an aqueous dispersion or solution which contains a major amount by weight (i.e. at least 50% by weight) of water (preferably softened water or water containing a chelating agent for hardening minerals, e.g. EDTA), and a minor amount by weight of the blend of rosin and tannin. As discussed above, the aqueous dispersion or solution is preferably adjusted to a substantially neutral or alkaline pH with an alkaline material.

The air entrainment agent may be added to a cementitious composition, e.g. a cement or a concrete mix, at any convenient point during its preparation, after which point substantial mixing of air will take place. For example, the blend may be added to portland cement clinker prior to grinding and thoroughly mixed with the cement during grinding. The blend may also be blended with the ground cement. The blend may be added to the water in which the cement, sand and/or gravel are mixed. The cement may be premixed with water and then either a dry or aqueous blend composition may be added. In general, either a dry or aqueous blend composition may be added to the cement, mortar or concrete mix at any stage prior to final mixing with air.

Cementitious compositions are cements, mortars, or concrete mixes which include concretes, mortars, neat paste compositions, oil well cement slurries, grouting compositions and the like. Cementitious compositions are discussed in the encyclopedia article "Cement" cited below. The cements used in the preparation of the cementitious compositions, especially concrete mixes, include Type I, II and III cements. These cements are well known and are described in "Cement", *Encyclopedia of Chemical Technology*, (Kirk-Othmer, eds, John Wiley & Sons, Inc., N.Y., N.Y., 5th ed., 1993), vol. 5, pp, 564–598, the disclosure of which is incorporated by reference herein. Portland cement is by far the most widely used hydraulic cement. The term "hydraulic cement" as used herein includes those inorganic cements which, when mixed with water, set and harden as a result of chemical reactions between the water and the compounds present in the cement. The term "Portland cements" as used herein includes those products prepared by heating a mixture of limestone and clay or shale, or other calcareous and argillaceous materials to a fused state and grinding the fused product, which is called clinker, with a few percent, normally about 4 to 6 percent, of a retarder such as gypsum. The term "concrete" as used herein includes a mixture of such hydraulic cements and inert aggregates. Typical aggregates include conventional aggregates such as gravel, sand, granite, limestone, and quartz sieve. Conventional hydraulic cement concretes, e.g. Portland cement concretes, employ major amounts, i.e. over 50%, usually up to about 75% by volume of such aggregates in the set product. Pozzalonic materials such as condensed silica fume and fly ash may also be included. The cements may be used to prepare concrete mixes containing 100 parts by weight of cement, from about 140 to about 260 parts by weight of sand, from about 100 to about 200 parts by weight of gravel, from about 35 to about 60 parts by weight of water and an amount of the blend composition of the invention effective to entrain the desired amount of air into the cementitious composition upon mixing with air. Preferred concrete mixes contain 100 parts by weight of cement, from about 160 to about 240 parts by weight of sand, from about 120 to about 180 parts by weight of gravel, from about 35 to about 60 parts by weight of water and an amount of the blend of this invention effective to entrain the desired amount of air into said composition.

The concentration of blend composition of this invention in the cementitious composition may vary, but will generally be less than about 1%, typically from about 0.0005% to about 0.5%, preferably from about 0.001% to about 0.01% (by weight of cement). After preparation, these cementitious compositions are then allowed to harden to obtain a hardened cement mass.

The amount of air to be entrained into the cement will depend upon the degree of freeze damage resistance desired in relation to the sacrifice of strength that can be tolerated. In general, the amount of air entrained will be less than about 15% by volume of the foamed cementitious composition, generally from about 5% to about 10%. The amount of air entrained into the cementitious composition can be determined in accordance with ASTM Method No. C-231, the disclosure of which is incorporated herein by reference. The mixing techniques commonly employed in mixing the solid and liquid components of the cementitious composition will typically also suffice to mix in the desired amount of air, but techniques and/or mixers specifically designed to add air to the mix can be employed, if desired.

For a fuller understanding of the nature and advantages of this invention, reference may be made to the following examples. These examples are given merely to illustrate the invention and are not to be construed in a limiting sense. While the invention has been described with reference to certain specific embodiments thereof, it is understood that it is not to be so limited since alterations and changes may be made therein which are within the full intended scope of the appended claims. All quantities, proportions and percentages are by weight and all references to temperature are °C. unless otherwise indicated.

EXAMPLES

Example 1

A solution or dispersion within the scope of this invention was prepared by mixing 7.5 parts by weight of a rosin gum (available as M grade from Akzo Coatings, Inc., Baxley, Georgia, and described as being comprised mostly of abietic, levopimaric, isopimaric and palustric acids). 7.5 parts by weight of quebracho tannin (available from Pilar River Plate Corporation, Newark, N.J., and described as containing 65% tannin, 10% non-tannin, 9.5% insolubles and 15.5% moisture), 5 parts by weight of a 50% solids solution of caustic and 80 parts by weight of water. The mixture exhibited a pH of 12.2 and was a dark brown, opaque liquid that appeared as a clear reddish solution upon dilution.

Example 2

A series of concretes were prepared by charging 5.45 kilograms of Portland cement, 10.9 kilograms of sand, 8.17 kilograms of gravel, and an initial amount of water (the amount was recorded) to a cement mixer and mixing was begun. Additional water was added until the gravel began to show wetness (the amount was recorded) and mixing was continued for about 3 minutes. Mixing was then stopped and the concrete mixture was allowed to sit in a quiescent state for 2.5 minutes.

Additives used in preparing the concrete mixes were as follows:

Additive A: a blend of the rosin and tannin of Example 1, but at the solids shown in the following table.

Additive B: a rosin gum available from Akzo Coatings, Inc., Baxley, Ga., under the designation of M grade and described as being comprised mostly of abietic, levopimaric, isopimaric and palustric acids.

Additive C: a resin available from W. R. Grace & Co., Cambridge, Mass., under the trade name "Daravair" and believed to be derived from southern pine stumpwood and comprised of a complex mixture of high-molecular-weight phenolic compounds, resin acids, and neutral materials (and believed to be similar to Vinsol NVX resin, available from Hercules Incorporated).

Additive D: a neutralized tannic acid material.

Additive E: industrial grade fatty acids available from Henkel Corporation, Ambler, Pa., as Aliphat 34R.

An aqueous sample of each additive was prepared at the solids shown in the following table. Each aqueous sample in the amount shown in the following table was then poured over a widespread area of the exposed surface of the mixture within 30 seconds. (As can be seen from the following table, the amount of each aqueous sample was adjusted in relation to the solids content of the aqueous sample so that 0.0055% of solids additive based on the weight of the cement (5.45 kilograms) was present in the resulting concrete mix.) Mixing of the concrete mixture was then resumed and additional water was added (the amount was recorded) if the mixture did not flow adequately. The concrete was then mixed for an additional two minutes. The water:cement weight ratio (W:C Ratio) of each sample is set forth in the following table along with the volume % of air entrained, as determined by ASTM Method C-231, immediately after mixing was concluded (initial) and at 20 minutes after mixing was concluded.

TABLE 1

EFFECT OF ADDITIVES ON AIR ENTRAINMENT IN CONCRETE

| Additive | | | W:C | Air Entrained (Volume %) | |
|---|---|---|---|---|---|
| Identity | Solids (wt %) | Amount (g) | Ratio | Initial | 20 min. |
| (none) | 0 | 6.0 | 0.508 | 2.92 | 2.81 |
| A | 5.0 | 6.0 | 0.508 | 7.50 | 6.57 |
| A | 5.0 | 12.0 | 0.508 | 10.95 | 10.55 |
| C | 5.0 | 6.0 | 0.508 | 6.66 | 6.96 |
| C | 5.0 | 12.0 | 0.508 | 9.32 | 9.27 |
| B | 15.0 | 2.0 | 0.495 | 6.98 | 6.53 |
| B | 15.0 | 1.0 | 0.495 | 5.39 | 4.96 |
| B | 15.0 | 4.0 | 0.495 | 9.10 | 8.30 |
| C | 15.0 | 2.0 | 0.495 | 7.20 | 6.20 |
| A | 5.0 | 6.0 | 0.495 | 7.64 | 7.25 |
| C | 5.0 | 6.0 | 0.495 | 7.18 | 6.81 |
| D | 5.0 | 6.0 | 0.495 | 3.26 | 2.63 |
| E | 5.0 | 6.0 | 0.495 | 4.58 | 4.52 |

Example 3

A solution or dispersion similar to that of Example 1, but with a weight ratio of 40/60 rosin/tannin can be prepared by using 6 parts by weight of said rosin and 9 parts by weight of said tannin. Such a mixture controlled the air content of a cement prepared therefrom to a small range and can serve to prevent inaccurate dose addition in industrial practice.

What is claimed is:

1. A composition useful for entraining air into a cementitious composition comprised of a blend consisting essentially of a rosin and a tannin in a ratio by weight of from about 1:1.22 to about 1:1.86 of rosin to tannin.

2. A composition as claimed in claim 1 wherein said composition is an essentially dry powder.

3. A composition as claimed in claim 1 wherein said composition has a moisture content of less than about 20% by weight.

4. A composition as claimed in claim 1 wherein said composition has a sufficiently low moisture content to render said composition flowable.

5. A composition as claimed in claim 1 which further contains an alkaline material in an amount sufficient to neutralize said blend.

6. A composition as claimed in claim 1 which further contains a major amount by weight of water.

7. A composition as claimed in claim 6 wherein said composition is an aqueous dispersion or solution containing said blend at a solids content of from about 5% to about 50% by weight.

8. A composition as claimed in claim 7 wherein said solids content is from about 10% to about 15% by weight.

9. A composition as claimed in claim 6 which further contains an alkaline material in an amount sufficient to neutralize said blend to an essentially neutral or alkaline pH, of from about pH 6 to about pH 13.

10. A composition as claimed in claim 1 wherein said rosin is comprised predominantly of monocarboxylic acids.

11. A composition as claimed in claim 1 wherein said rosin is an unmodified gum rosin.

12. A composition as claimed in claim 1 wherein said rosin is comprised predominantly of monocarboxylic acids of alkylated hydroxyphenanthrene compounds.

13. A composition as claimed in claim 1 wherein said tannin is a natural tannin.

14. A composition as claimed in claim 1 wherein said tannin is a flavotannin.

15. A composition as claimed in claim 1 wherein said tannin is quebracho tannin.

16. A composition as claimed in claim 1 wherein said tannin is comprised of at least 60% by weight of compounds identified as tannins.

17. A composition as claimed in claim 1 wherein said rosin is comprised of at least about 50% by weight of carboxylic acids.

18. A composition as claimed in claim 1 wherein said rosin is comprised of at least about 90% by weight of monocarboxylic acids.

19. A composition as claimed in claim 1 wherein said weight ratio of rosin to tannin is from about 1:1.38 to about 1:1.63.

20. A composition as claimed in claim 1 wherein said weight ratio of rosin to tannin is from about 1:1.44 to about 1:1.56.

21. A composition as claimed in claim 1 wherein said weight ratio of rosin to tannin is about 1:5.1.

22. A composition useful for entraining air into a cementitious composition comprised of a blend consisting essentially of an unmodified gum rosin comprised predominantly of monocarboxylic acid compounds and a tannin comprised of at least 60% by weight of compounds identified as tannins in a ratio by weight of said rosin to said tannin of from about 1:1.22 to about 1:1.86, said blend yielding an aqueous solution or dispersion having a pH of from about pH 6 to about pH 13.

23. A cementitious composition comprising a hydratable cementitious material in a major amount by weight and an air entrainment agent consisting essentially of a rosin in a minor amount by weight of said cementitious composition and a tannin and in a minor amount by weight of said cementitious composition, the ratio by weight of said rosin to said tannin ranging from about 1:1.22 to about 1:1.86.

24. A composition as claimed in claim 23 wherein the total of said minor amount by weight of said rosin and said minor amount by weight of said tannin is from about 0.0005% to about 0.5% by weight based on the weight of said hydratable cementitious material.

25. A composition of claim 23 wherein said cementitious material is comprised of a Portland cement.

26. A composition of claim 23 wherein said cementitious material is a concrete formulation comprising a Portland cement of type I, II, or III.

27. A method of entraining air into a cementitious composition comprising mixing a minor amount by weight of an air entrainment agent consisting essentially of a rosin and a tannin in a ratio by weight of from about 1:1.22 to about 1:1.86 with major amount by weight of a hydratable cementitious composition comprised of a cement and water.

28. A method as claimed in claim 27 wherein the amount of said air entrainment agent is effective to entrain from about 1% to about 20% by volume of air into said cementitious composition.

* * * * *